United States Patent [19]
Barbieri

[11] B 3,984,676
[45] Oct. 5, 1976

[54] LIGHT-MEASURING APPARATUS WITH LAMP INDICATOR FOR DETERMINING BALANCE OF A MEASURING BRIDGE

[75] Inventor: Siegfried Barbieri, Brixen, Italy

[73] Assignee: Durst AG. Fabrik Fototechnischer Apparate Bozen, Bolazno-Bozen, Italy

[22] Filed: Oct. 18, 1974

[21] Appl. No.: 515,908

[44] Published under the second Trial Voluntary Protest Program on January 20, 1976 as document No. B 515,908.

[30] Foreign Application Priority Data
Oct. 26, 1973 Italy.................................. 4882/73

[52] U.S. Cl................................ 250/210; 315/134; 340/285; 356/226
[51] Int. Cl.².................... G01J 1/44; H01J 39/12
[58] Field of Search ........... 356/226, 227; 250/210; 340/285; 315/129, 134, 135, 136

[56] References Cited
UNITED STATES PATENTS
3,530,378  9/1970  Holle et al. ..................... 250/210 X
3,794,430  2/1974  Maida ............................... 356/226

OTHER PUBLICATIONS
Electronic Indicator, article in Electronic Engineering, vol. 46, No. 554, Apr., 1974, p. 11.

Primary Examiner—Archie R. Borchelt
Assistant Examiner—E. R. La Roche
Attorney, Agent, or Firm—Connolly and Hutz

[57] ABSTRACT

This invention relates to a light-measuring apparatus wherein a photoelectric element is arranged in a leg of a measuring bridge, the output voltage of said element controlling the brightness of two signal lamps.

5 Claims, 2 Drawing Figures

*Fig. 1.*
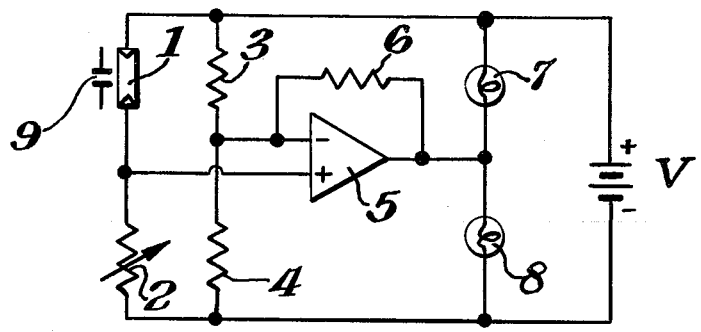
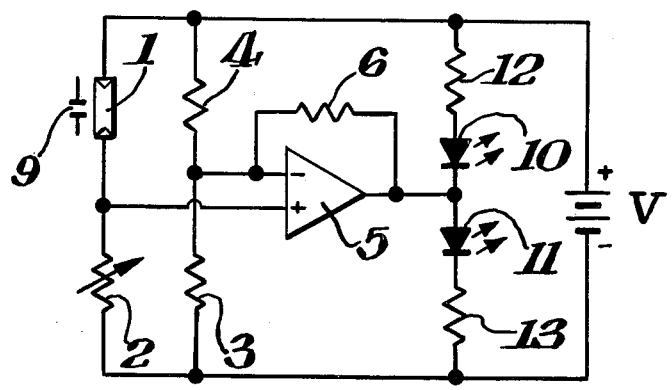
*Fig. 2.*

LIGHT-MEASURING APPARATUS WITH LAMP INDICATOR FOR DETERMINING BALANCE OF A MEASURING BRIDGE

BACKGROUND OF THE INVENTION

There are light measuring apparatus known wherein the direction and the extent of detuning of the measuring bridge is indicated not by an indicating instrument but by the evaluation of the relative brightness of two signal lamps. The measuring bridge is indicated to be balanced when both signal lamps burn with equal brightness.

A drawback of these apparatus is that the evaluation of the relative brightness in the proximity of the balanced state of the measuring bridge is very difficult and also with small brightness differences, not always detected by the naked eye in the same measurement. The measuring bridge may already be extremely detuned to such an extent that the values ascertained are outside the allowable error tolerance.

For the elimination of this drawback, an arrangement has been proposed wherein three signal lamps are employed, of which one serves for the positive indication of the balanced condition, while the other two light up depending on the detuning of the measuring bridge.

This arrangement indeed eliminates the uncertainty, conditioned by the evaluation of the lamp brightness during the balancing procedure, but requires a certain expenditure for structural components, which make the light measuring apparatus more expensive and makes its utilization more complicated in that the illuminating effect of three lamps must be observed.

The object of the invention is to provide a light-measuring apparatus, without instruments, of the initially mentioned type wherein the brightness differences (evaluated only with difficulty) of both signal lamps do not influence the balancing of the measuring bridge above the allowable error tolerances; and this object should be realized with the fewest possible components to facilitate extensive miniaturization of the apparatus.

SUMMARY OF THE INVENTION

According to the invention, the object is solved in that the outputs of the measuring bridge are connected with the inputs of a sum-and-difference amplifier whose amplification factor is selected to be so high that a simultaneous lighting up of both signal lamps connected with the output of the sum-and-difference amplifier occurs only within the error tolerance allowable for the balancing of the measuring bridge.

In a further development of the invention, the exactness of the balancing is, increased in that signal lamps are employed which have a luminous effect only past a certain voltage threshold.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which:

FIG. 1 is a circuit diagram of a novel light-measuring apparatus which is one embodiment of this invention; and FIG. 2 is a modification of the light-measuring apparatus of FIG. 1 with luminous diodes used as signal lamps.

DESCRIPTION OF THE PREFERRED EMBODIMENTS

In one leg of a Wheatstone bridge, fed by a power source of potential V is arranged a photoelectric element, e.g. a photoconductive cell 1. In the remaining legs of the bridge are inserted resistors 2, 3, 4, of which one or several may be constructed as variable resistors.

The outputs of the bridge are connected with the inverting or non-inverting input of operational amplifier 5, which is utilized as a sum-and-difference amplifier. The amplification factor of the operational amplifier is determined by the proportion of the ohmic values of a resistor 6, arranged in the feedback circuit of the operational amplifier 5, and the parallel-connected resistors 3 and 4.

Arranged in series parallel to the source of potential V are two signal lamps, e.g. incandescent lamps 7 and 8. The output of the operational amplifier 5 is connected with lamps 7, 8 in such a manner that they shine with equal brightness in a balanced bridge.

The amplification factor of the operational amplifier is selected by means of respective dimensioning of resistors 3, 4 and 6 to be so high that the bridge, with a simultaneous illumination of both signal lamps, is balanced independent of their brightness differences within the allowable error range; and with a detuning of the bridge beyond this error range, only one of the two signal lamps is lighted and shows the direction of the necessary balance. The bridge being then balanced either by manipulating one of its variable resistors or by adjusting a diaphragm 9, positioned before the photoconductive cell 1 and having an adjustable aperture.

The user is thus spared the difficult task of having to precisely evaluate the differences in brightness between the signal lamps during the balancing procedure. Once the balanced setting is achieved in which both signal lamps are both lighted, the bridge must be balanced within the required error range. The extent of the error range depends on the selected amplification factor of the sum-and-difference amplifier.

The error range, within which both signal lamps light up simultaneously, may be limited still further by the form of the invention illustrated in FIG. 2.

In place of both incandescent lamps 7, 8 two luminous effect diodes 10, 11 are employed, which have the property of showing an illuminating effect only above a certain threshold voltage. The use of these luminous diodes 10, 11 also allows the use of an operational amplifier 5, which has a certain residual voltage that with the use of incandescent lamps as signal lamps would not allow them to be returned off even with a strongly detuned bridge.

In the use of such operational amplifier, signal lamps are employed whose voltage threshold is higher than the residual voltage of the operational amplifier, so that a simultaneous illumination of the signal lamps can occur only with respect to a bridge tuned within the error range mentioned.

Resistors 12, 13, coupled with luminous diodes 11, 10, limit the current received by the luminous diodes.

In place of the luminous effect diodes, in the same manner there may also be used other signal lamps which show an illuminating effect only beyond a voltage threshold, e.g. fluorescent lamps. The voltage threshold value being produced by their ignition or extinguishing voltages.

The invention is not limited only to the instances of application wherein both signal lamps light up in a balanced measuring bridge but instead also to the instances of application wherein the signal lamps are extinguished in a balanced measuring bridge, for which purpose only a slight technical alteration (known to those skilled in the art) in the circuitry is required relative to the arrangement fully described.

I claim:

1. A light-measuring apparatus comprising a measuring bridge, a photoelectric element is arranged in a leg of the measuring bridge, the voltage obtained from the measuring bridge controlling the brightness of two signal lamps arranged in series parallel to a power source feeding the measuring bridge, characterized in that the outputs of the measuring bridge are connected with the inputs of a sum-and-difference amplifier, the output of the sum-and-difference amplifier being connected to a junction between the two signal lamps, the amplification factor of the sum-and-difference amplifier being arranged to be high enough that a simultaneous illumination of both signal lamps connected with the output of the sum-and-difference amplifier only occurs within a predetermined error range allowable for the balancing of the measuring bridge.

2. The light-measuring apparatus of claim 1, characterized in that signal lamps are employed, which have an illuminating effect only beyond a certain voltage threshold.

3. The light-measuring apparatus of claim 2, characterized in that the value of the voltage threshold is equal to or higher than the value of the residual voltage of the sum-and-difference amplifier.

4. The light-measuring apparatus of claimm 2, characterized in that luminous diodes are employed as the signal lamps.

5. The light-measuring apparatus of claim 2, characterized in that fluorescent lamps are employed as the signal lamps.

* * * * *